Figure 1:
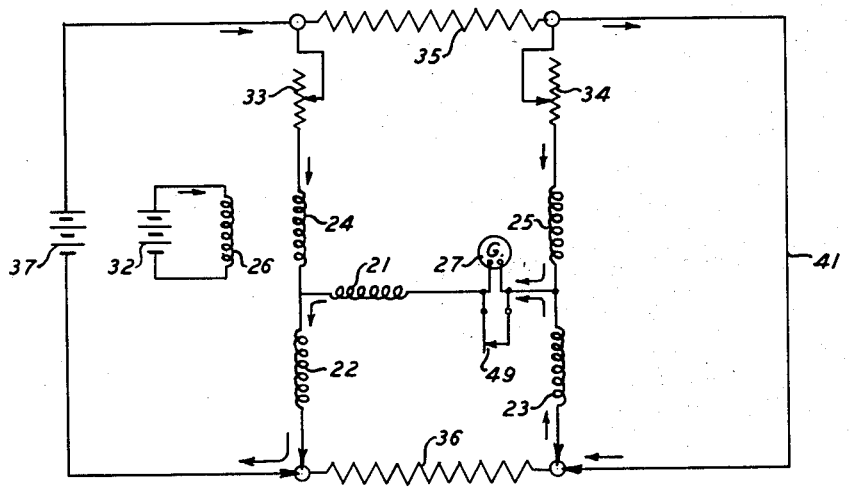

Feb. 20, 1934.   W. E. PRINCE   1,948,238

APPARATUS FOR TESTING ELECTRICAL CONDUCTORS

Filed April 7, 1933

INVENTOR
W. E. PRINCE
BY
E. R. Nowlan
ATTORNEY

Patented Feb. 20, 1934

1,948,238

UNITED STATES PATENT OFFICE 1,948,238

APPARATUS FOR TESTING ELECTRICAL CONDUCTORS

William E. Prince, Lyndhurst, N. J., assignor to Western Electric Company, Incorporated, New York, N. Y., a corporation of New York Application April 7, 1933. Serial No. 664,870

8 Claims. (Cl. 175—183)

The invention relates to apparatus for testing electrical conductors, and more particularly to apparatus for comparing the conductivity of low resistance electrical elements.

In the prior art, in some instances, it has been the practice to employ Kelvin double bridge circuits for measuring and/or comparing the conductivity of elements having low resistance. A galvanometer is usually employed with the Kelvin double bridge circuit for indicating the balance condition of the bridge. When a number of tests are to be made rapidly in succession, a galvanometer is not entirely satisfactory, and it is desirable that a relay be employed to set up indicating circuits.

An object of the invention is to provide an improved apparatus for readily and accurately comparing the conductivity of low resistance electrical elements with a known or standard value.

To accomplish this object there is provided in a preferred embodiment of the invention a polar relay having six windings. Four of the windings are connected in the arms of the main and auxiliary ratio circuits. The fifth winding is connected across the ratio circuits in place of the galvanometer, and the sixth winding is a polarizing winding employed to increase the sensitivity of the relay.

In the embodiment herein disclosed the windings in the two arms of the main ratio circuit have the same number of turns and are connected in series opposing with respect to currents passing from the positive side of the source of potential, through the main ratio circiut to the negative side of the source of potential. The windings in the auxiliary ratio circiut have the same number of turns and are connected in series opposing with respect to currents passing from the junction of the known resistance and the yoke, through the auxiliary ratio circuit, to the junction of the yoke and unknown resistance. This will prevent currents flowing through the ratio arms in the directions referred to from causing the relay to operate when the bridge is in a balanced condition. The resistances of the arms on opposite sides of the bridge are made equal and the windings forming arms on the opposite sides of the bridge are arranged to be in series opposing with respect to each other. When the windings are arranged as referred to, the currents flowing through them while the bridge is in a balanced condition will neutralize each other and will not cause the relay to operate, while when the bridge is in an unbalanced condition, four of the windings will have currents passing therethrough in a series aiding relation with respect to the sixth or polarizing winding.

A resistance range switch is employed for connecting different known resistances in the circuit. It has two arms, one of which establishes a high current circuit, and the other a low current or potential circuit. The switch eliminates the potential drop across the current carrying switch contacts from affecting the potential circuit.

Figure 2:
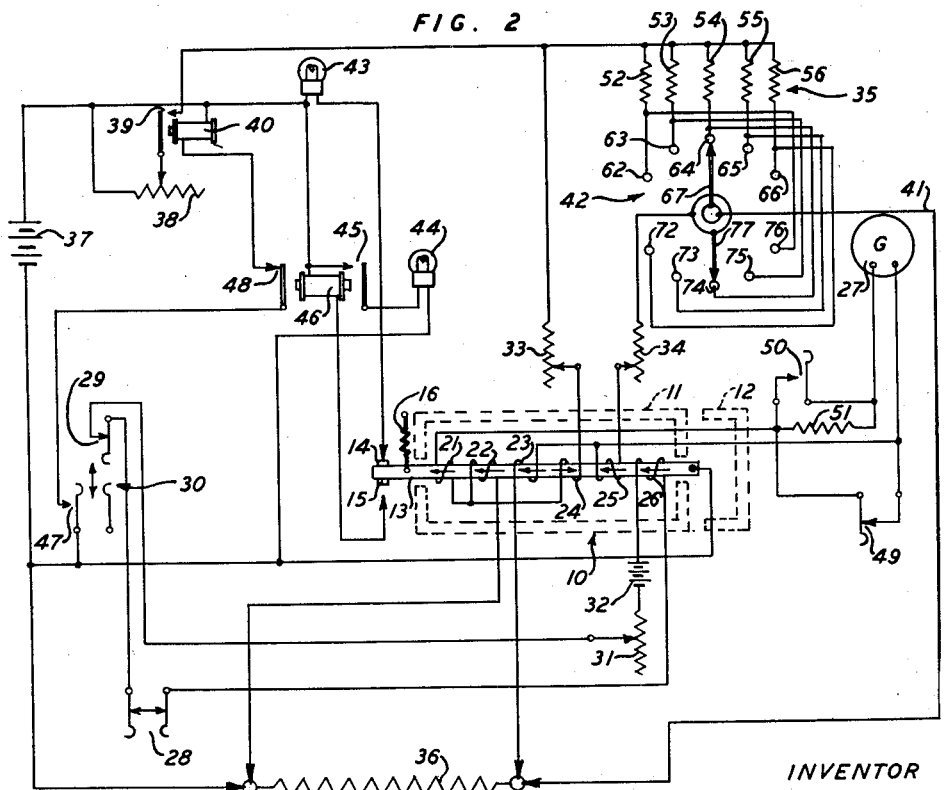

Other objects and advantages of the invention will become apparent from the following detailed description and accompanying drawing, in which Fig. 1 illustrates schematically the bridge circuit and the windings of the associated relay shown in Fig. 2, and Fig. 2 illustrates a preferred embodiment of the invention.

The relay 10 is preferably a polar relay having a yoke 11, a permanent magnet 12 associated with the yoke, and an armature 13 arranged to swing between contacts 14 and 15. The armature 13 is biased by means of a spring 16 so that it is normally in connection with contact 14. The relay 10 has six windings 21, 22, 23, 24, 25 and 26. Windings 22 and 24 are connected together in the main ratio circuit of the bridge, and windings 23 and 25 are connected together in the auxiliary ratio circuit. The winding 21 is connected in series with a galvanometer 27 between the connection of windings 22 and 24, and the connection of windings 23 and 25. The winding 26 is a polarizing winding and is connected in series with the contacts of a switch 28, the contact 29 of another switch 30, a variable resistance 31, and a source of potential 32.

Variable resistances 33 and 34 are connected in series with the relay windings in the main and auxiliary circuits, respectively, to the terminals of a standard or known resistance 35. Windings 22 and 23 of the main and auxiliary ratio circuits, respectively, are connected to the ends of the unknown resistance 36. A source of potential 37 is connected in series with a variable resistance 38, a contact 39 on a relay 40 across the main ratio circuit. A yoke 41 is connected across the auxiliary ratio circuit from the connection of the unknown resistance 36 and the auxiliary ratio circuit to a double arm switch 42, which connects the auxiliary ratio circuit and the standard or known variable resistance 35 together.

The winding 26 is provided to increase the sensitivity of the relay and is adjusted so that the relay will not operate when the bridge is balanced but will operate on a small current value through the other windings when the bridge is unbalanced.

Windings 22 and 24 have the same number of turns and are connected in series opposing with respect to current flowing through them from the variable resistance 33 to the connection of the negative side of the source of potential 37, and the unknown resistance 36. Windings 23 and 25 have the same number of turns and are connected in series opposing with respect to current passing through them from the variable resistance 34 to the connection of the unknown resistance 36 and the yoke 41. Windings 22 and 24 are connected so that current flowing through them will produce a flux opposite to that produced by windings 23 and 25, respectively, when current flows through them in the direction above mentioned. The resistances of windings 24 and 25 are made equal and the resistance of windings 22 and 23 are also made equal. This facilitates the adjustment of the circuit as resistances 33 and 34 can then be varied simultaneously by means of a double arm switch arrangement well known in the art.

A lamp 43 is connected between the positive side of the source of potential 37 and the contact 14 of the relay 10. The armature 13 of the relay 10 is connected to the negative side of the source of potential 37. The lamp 43 will be lighted when the bridge is in a balanced condition and the armature in the position as shown in Fig. 2. The lamp 44 is connected between the negative side of the source of potential 37 and the normally open contact 45 of relay 46. The winding of relay 46 is connected from contact 15 of relay 10 to the positive side of the source of potential 37. The winding of relay 40 is connected across the source of potential 37, through the contact 47 on switch 30 and the normally closed contact 48 on relay 46.

A normally closed contact 49 is connected across the galvanometer 27 and a normally open contact 50 is connected across a resistance 51, which is in series with the galvanometer 27.

The variable standard resistance 35 comprises individual resistance units 52, 53, 54, 55 and 56, each connected to high current carrying contacts 62, 63, 64, 65 and 66, and to low current carrying contacts 72, 73, 74, 75 and 76, respectively, of the double arm switch 42. The double arm switch 42 has two arms 67 and 77 insulated from each other and arranged to rotate together. The arm 67 makes contact with the contacts 62 to 66, inclusive, and is connected to the yoke 41. The arm 77 makes contact with the contacts 72 to 76, inclusive, and is connected to the variable resistance 34 in the auxiliary ratio circuit. This type of switch permits the use of a single set of variable resistances 52 to 56, inclusive, and at the same time prevents any voltage drop across the high current carrying contacts 62 to 66, inclusive, and the arm 67 from affecting the voltage applied to the auxiliary ratio circuit.

When it is desired to employ the bridge to compare resistance conditions in an unknown, such for example as the condition of a plurality of soldered joints without visually inspecting each joint to determine whether it has been properly soldered, the bridge is connected at 36 to a soldered joint known to be in proper condition. The switch 28 is opened to deenergize the winding 26 of relay 10. The switch 49 is opened to render the galvanometer 27 operative. The contact 47 on switch 30 is closed. This operates relay 40, closing the circuit between the positive side of the source of potential 37 and the connection between the known resistance 35 and the main ratio circuit. The bridge is then adjusted by varying resistances 33 and 34 and operating the double arm switch 42 until no current flows through the galvanometer 27.

Where $r$ is the resistance of an element of the bridge circuit and the elements are proportional so that $$\frac{r_{34}+r_{25}}{r_{23}} = \frac{r_{33}+r_{24}}{r_{22}}$$

the formula for the bridge reduces to the simplest form $$r_{36} = r_{35} \cdot \frac{r_{23}}{r_{34}+r_{25}}$$

Therefore, since $r_{23}$ is made equal to $r_{25}$ and the resistances 33 and 34 are varied together to maintain them equal, the bridge will be properly balanced when no current flows through the galvanometer 27.

In this condition no current will flow through the winding 21 of relay 10. Current will flow through the main ratio circuit from the positive side of the source of potential 37, through resistance 33, windings 24 and 22 to the negative side of the source of potential, but as windings 24 and 22 are connected in series opposing with respect to currents flowing in this direction, and as the windings have the same number of turns each will neutralize the flux induced by the other. Any small current which may flow through the windings 25 and 23 of relay 10 from the known resistance 35 to the unknown resistance 36 will also be neutralized as windings 25 and 23 are connected in series opposing for currents flowing in this direction.

The armature 13 of relay 10 will be in the position shown in Fig. 2, in contact with contact 14, and the lamp 43 will be lighted. Switch 28 is then closed to energize the winding 26 of relay 10, and the variable resistance 31 is adjusted to a value such that the armature 13 will not leave the contact 14, but a slight increase in the current would cause the armature to leave the contact 14.

The soldered joint to be inspected is then connected to the bridge at 36. If it is in proper condition the bridge will remain balanced. If the soldered joint is poor or opened the bridge will be unbalanced. Current will then flow through the branches of the bridge circuit as indicated by the arrows in Fig. 1 and the flux induced in the armature 13 of the relay 10 will be as shown by the arrows in Fig. 2. The flux induced by windings 21, 22, 23 and 25 will aid each other and that induced by the winding 26. The flux induced by the winding 24 will oppose that of the other windings, but as only a portion of the current flowing through the winding 22 flows through the winding 24, each of the windings 21, 22, 23 and 25 will aid in operating the relay 10. The operation of relay 10 will break the circuit through the lamp 43 and cause the relay 46 to operate. When the relay 46 is operated, a circuit is completed from the negative side of the source of potential 37 through the lamp 44 and contact 45 of relay 46, to the positive side of the source of potential 37, causing the lamp 44 to light and indicate an unbalanced condition of the bridge. The contact 48 on relay 46 opens when relay 46 operates and breaks the circuit through the winding of relay 40. Relay 40 will release and disconnect the positive side of the source of potential 37 from the bridge circuit.

While a single embodiment of the invention has been shown and described in detail, it is understood that the invention is generic in character and is not to be construed as limited to the particular embodiment shown since numerous modifications thereof may be made by persons skilled in the art without departing from the spirit of applicant's invention, the scope of which is to be determined by the appended claims.

What is claimed is:

1. In an apparatus for testing an electrical element, an electrical circuit including a Kelvin double bridge, said bridge having an arm including the element to be tested, an arm including a variable resistance, and an electromagnetic device associated with the bridge having a winding in the second mentioned arm and another winding connected across the bridge.

2. In an apparatus for testing an electrical element, an electrical circuit including a Kelvin double bridge, said bridge having an arm including the element to be tested, and a relay associated with the bridge having three windings two of which are connected in individual bridge arms and the third of which is connected across said bridge and to the other two windings.

3. In an apparatus for testing an electrical element, an electrical circuit including a Kelvin double bridge, said bridge having an arm including the element to be tested, and an electromagnetic device associated with the bridge having three windings two of which are connected in individual bridge arms and the third of which is connected across said bridge and to the other two windings, said third winding being arranged to be in series aiding with each of the other two windings.

4. In an apparatus for testing an electrical element, an electrical circuit including a Kelvin double bridge with two arms comprising a main ratio circuit and two other arms comprising an auxiliary ratio circuit, said bridge having another arm including the element to be tested, and a relay associated with the bridge having five windings four of which are connected in the individual main and auxiliary ratio arms and the fifth of which is connected to each of the other four windings said fifth winding being arranged to be in series aiding with one of the other four windings.

5. In an apparatus for testing an electrical element, an electrical circuit including a Kelvin double bridge having a high current carrying path and a low current carrying path, a variable resistance included in both paths, a double arm switch for controlling the amount of resistance included in the paths, one of said arms being connected to the high current carrying circuit and the other of said arms being connected to the low current carrying circuit to eliminate the voltage drop across the high current carrying contacts of the switch from affecting the voltage applied to the low current carrying path of the bridge.

6. In an apparatus for testing an electrical element, an electrical circuit including a Kelvin double bridge and an electromagnetic device with a plurality of windings thereon, said bridge having an arm including the element to be tested, two other arms comprising individual windings of said electromagnetic device and connected to the element to be tested, and a third winding of said electromagnetic device connected across said bridge and to the windings connected to the element to be tested.

7. In an apparatus for testing an electrical element, an electrical circuit including a Kelvin double bridge and an electromagnetic device, said Kelvin double bridge having a main ratio circuit and an auxiliry ratio circuit, one of said ratio circuits comprising two windings of said electromagnetic device connected in series aiding with respect to currents flowing therethrough when said bridge is unbalanced and a third winding on said electromagnetic device connected to each of said first mentioned two windings.

8. In an apparatus for testing an electrical element, an electrical circuit including a bridge having a high current carrying path and a low current carrying path, a variable resistance included in both paths, a switch for controlling the amount of resistance included in the paths and comprising high current carrying contacts, low current carrying contacts, and two arms insulated from each other and rotatable together for connecting the resistance to the contacts and eliminating the voltage drop across the high current carrying contacts of the switch from affecting the voltage applied to the low current carrying path.

WILLIAM E. PRINCE.